US006898540B2

(12) United States Patent
Davies

(10) Patent No.: US 6,898,540 B2
(45) Date of Patent: May 24, 2005

(54) SYSTEM AND METHOD FOR DISPLAYING REAL-TIME TURBINE CORRECTED OUTPUT AND HEAT RATE

(75) Inventor: Stephen J. Davies, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 168 days.

(21) Appl. No.: 10/291,844

(22) Filed: Nov. 12, 2002

(65) Prior Publication Data

US 2004/0117148 A1 Jun. 17, 2004

(51) Int. Cl.$^7$ .............................................. G01D 18/00
(52) U.S. Cl. ....................................... 702/85; 702/105
(58) Field of Search ........................... 60/773; 702/182, 702/85, 105, 33, 113; 701/100

(56) References Cited

U.S. PATENT DOCUMENTS

| | | | |
|---|---|---|---|
| 3,873,817 A | | 3/1975 | Liang |
| 4,215,412 A | * | 7/1980 | Bernier et al. .............. 701/100 |
| 4,410,950 A | | 10/1983 | Toyoda et al. |
| 4,891,948 A | | 1/1990 | Kure-Jensen et al. |
| 5,080,496 A | * | 1/1992 | Keim et al. ................. 374/144 |
| 5,748,500 A | | 5/1998 | Quentin et al. |
| 5,761,895 A | * | 6/1998 | Chu et al. .................. 60/39.03 |
| 6,167,690 B1 | * | 1/2001 | Hepner et al. ............. 60/39.03 |
| 6,532,412 B2 | * | 3/2003 | Adibhatla et al. .......... 701/100 |
| 2002/0123870 A1 | | 9/2002 | Chan et al. |

OTHER PUBLICATIONS

"GE Control System Toolbox", EX2000 Excitation System, Jul. 23, 2001, pp. 1–2.
"Speedtronic™ Mark VI TMR Feed Pump Turbine Control", GE Industrial Systems, 2000, pp. 1–19.
"Speedtronic™ Mark VI TMR Industrial Steam Turbine Control", Industrial Systems, 2000, pp. 1–20.
"Speedtronic™ Mark VI TMR New Unit, Heavy Duty Gas Turbine Control", GE Industrial Systems, 2000, pp. 1–18.
"Speedtronic™ Mark VI Turbine Control", GE Industrial Systems, 2000, pp. 1–8.
"Turbine Generator Controls", GE Industrial Systems, GEA 12508, Jul. 23, 2001, pp. 1–8.
"Speedtronic™ Mark V Steam Turbine Controls", GEA 12103B, Jul. 23, 2001, pp. 1–2.
"Speedtronic™ Mark VI TMR Turbine Control", GE Industrial Systems, 2002, pp. 1–21.
"Speedtronic™ Mark V", GE Industrial Systems, 2000, pp. 1–14.

* cited by examiner

Primary Examiner—Marc S. Hoff
Assistant Examiner—Paul L Kim
(74) Attorney, Agent, or Firm—Nixon & Vanderhye P.C.

(57) ABSTRACT

A method for generating and displaying in real time performance parameters of a turbine including: monitoring the performance of the turbine and collecting real time data regarding turbine performance; determining a corrected turbine output value and corrected heat rate value from the collected real time data; electronically storing the corrected turbine output value and heat rate value and a corresponding time, and displaying a current corrected turbine output value, heat rate and a corresponding time.

6 Claims, 3 Drawing Sheets

SYSTEM AND METHOD FOR DISPLAYING REAL-TIME TURBINE CORRECTED OUTPUT AND HEAT RATE

BACKGROUND OF THE INVENTION

This invention relates generally to the field of turbine controls and, more particularly, to display systems showing turbine performance.

Industrial and power generation gas turbines have control systems ("controllers") that monitor and control their operation. These controllers generate data regarding the performance of the turbine. The data may be displayed by the controller so that human operators may monitor the operation of the turbine.

Corrected turbine output and corrected heat rate are useful performance parameters that indicate the thermodynamic health of the turbine. However, conventional controllers have not displayed corrected heat rate and output of a turbine. There is a long-felt need for data regarding corrected heat rate and output of turbines. There is also a need for this data to be presented in real time and historically.

BRIEF DESCRIPTION OF THE INVENTION

In a first embodiment, the invention is a method for generating and displaying in real time performance parameters of a turbine including: monitoring the performance of the turbine and collecting real time data regarding turbine performance; determining a corrected turbine output value from the collected real time data; electronically storing the corrected turbine output value and a corresponding time, and displaying a current corrected turbine output value and a corresponding time.

In a second embodiment, the invention is a method for generating and displaying in real time performance parameters of a turbine including: monitoring the performance of the turbine and collecting real time data regarding turbine performance; determining a corrected turbine heat rate from the collected real time data; electronically storing the corrected turbine heat rate value and a corresponding time, and displaying a current corrected turbine heat rate value and its corresponding time.

DETAILED DESCRIPTION OF THE INVENTION

Figure 1:
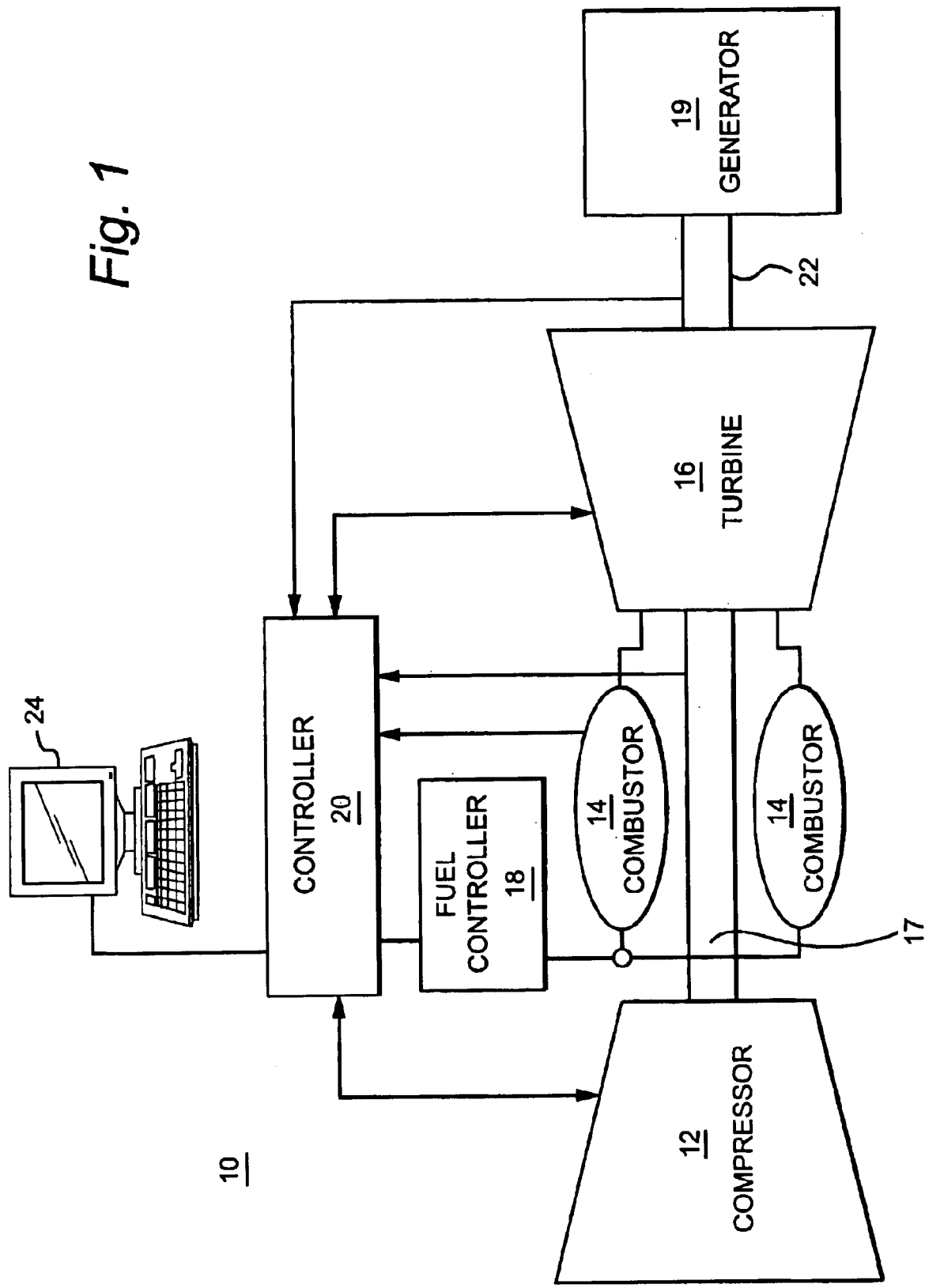
FIG. 1 is a schematic depiction of a gas turbine having a fuel control system and a controller display.

FIG. 1 shows a gas turbine 10, that includes a compressor 12, combustor 14, turbine 16 connected to the compressor by a shaft 17, fuel controller 18 and a gas turbine control system 20. The gas turbine drives a generator 19 through shaft 22 to produce electrical power. The control system 20 monitors the operation of the gas turbine by sensors that detect, for example, the power output from the turbine, rotational speed of the compressor and turbine, turbine inlet and exhaust temperatures, fuel flow to the combustor, compressor pressure and other operating conditions.

The control system(s) 20, 18 may be a conventional General Electric Speedtronic™ Mark V Gas Turbine Control System. The SpeedTronic controller monitors various sensors and other instruments associated with a gas turbine. In addition to controlling certain turbine functions, such as fuel flow rate, the SpeedTronic controller generates data from its turbine sensors and presents that data for display to the turbine operator. The data may be displayed using software that generates data charts and other data presentations, such as the General Electric Cimplicity™ HMI software product. However, the display features of this conventional controller and control presentation do not provide a display for corrected turbine output or corrected turbine heat rate.

The Speedtronic™ control system is a computer system that includes microprocessors that execute programs to control the operation of the gas turbine using sensor inputs and instructions from human operators. The control system includes logic units, such as sample and hold, summation and difference units, that may be implemented in software or by hardwire logic circuits. The commands generated by the control system processors cause actuators on the gas turbine to, for example, adjust the fuel control system that supplies fuel to the combustion chamber, set the inlet guide vanes to the compressor, and adjust other control settings on the gas turbine.

The controller 20 includes computer processors and data storage that convert the sensor readings to data using various algorithms executed by the processors. The data generated by the algorithms are indicative of various operating conditions of the gas turbine. The data may be presented on operator displays 22, such as a computer work station, that is electronically coupled to the operator display. The display and or controller may generate data displays and data printouts using software, such as the General Electric Cimplicity™ data monitoring and control software application.

Figure 2:
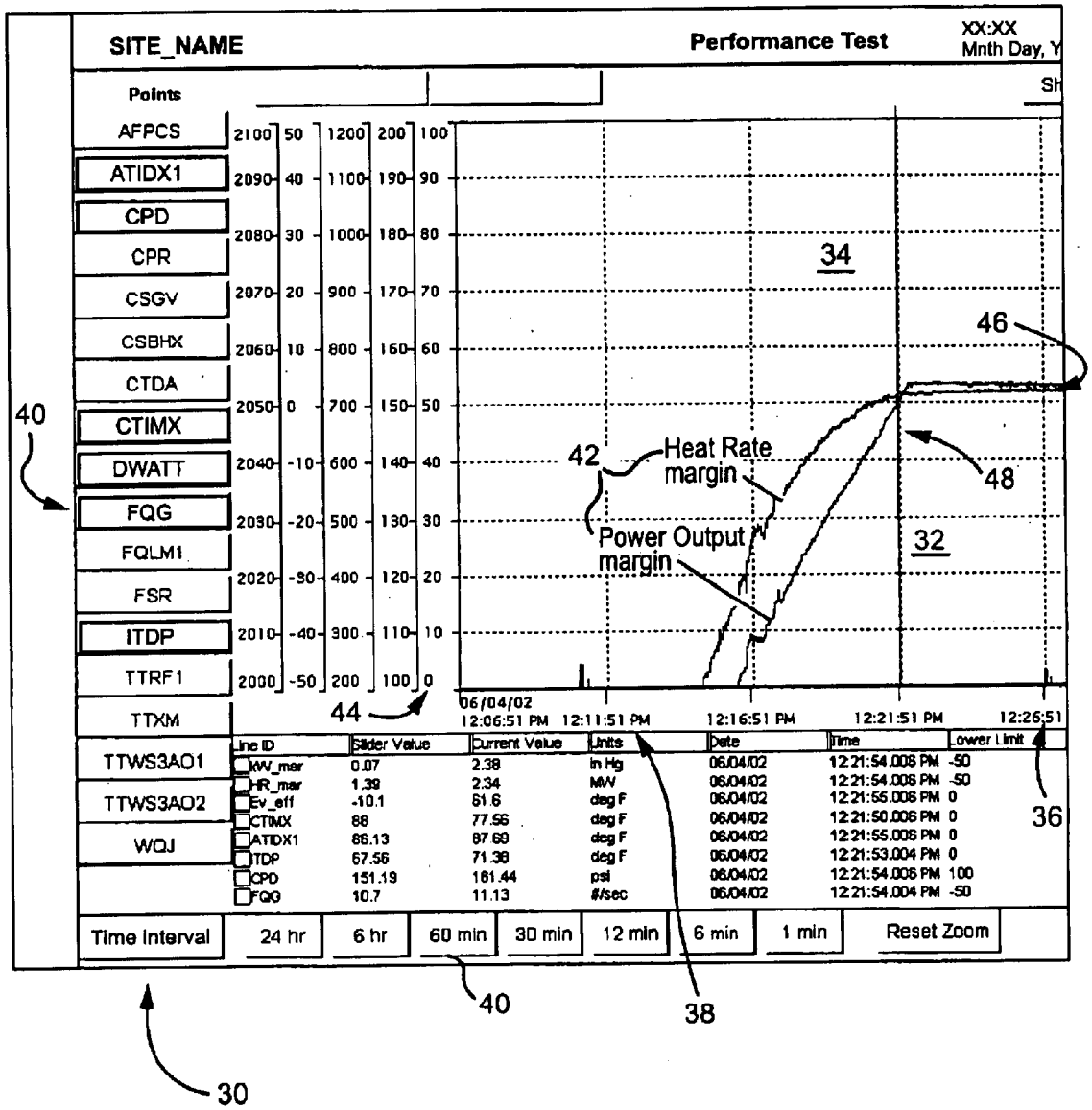
FIG. 2 is an exemplary screen display showing real time and historical values of various gas turbine performance parameters.

FIG. 2 is an exemplary display screen 30 from the display 24 that shows current and past performance test data from an operating gas turbine. The data display screen 30 includes a chart 32 showing various line graphs 34 performance parameters as a function of time. The line graphs 34 show the current value of gas turbine parameters and the recent historical values for those parameters. The horizontal axis of the chart shows a current time period 36 and a period of time 38 immediately proceeding the current time. Soft function keys 40 allow a person viewing the display to select the parameters to be displayed and the duration of the displayed time period.

The line graphs 34 may provide current and recent historical values for the corrected turbine output power ("Power Output margin") and the corrected turbine heat rate ("Heat Rate margin") 42. These values of Power Output and Heat Rate may be presented as a percentage 44 of the maximum of normal operating value for these parameters.

The values for Power Output and Heat Rate margin are determined based on the algorithms set forth below and are derived from real-time signals from sensors monitoring the operation of the gas turbine. The real-time values of corrected turbine heat rate and corrected turbine output power are useful for useful to the operator of the gas turbine as they provide information regarding the turbine performance. In particular, the corrected real time turbine power output margin indicates the available additional power that can be generated which is particularly helpful to manage the power output of a power generation station. Similarly, the corrected turbine heat rate margin provides helpful information to determine the efficiency of the gas turbine.

As is evident from the following algorithms, the heat rate and turbine output power are corrected to account for ambient pressure and temperatures. By correcting for ambient conditions, the values of current corrected turbine output power and corrected heat rate may be compared to historical values without further adjustment for variations in ambient conditions.

The display of current 46 and recent historical 48 values of corrected turbine output power and corrected heat rate allow the operator to readily identify abrupt changes in the heat rate or output power, and monitor trends in the heat rate and output power. The period of time that the recent historical values for corrected output power and corrected heat rate are displayed may be selected by the operated by using the user controls for the display. The historical information regarding the corrected turbine power outlet may be juxtaposed with the current corrected turbine output margin and heat rate margin, as is done in line graphs 42.

The corrected gas turbine-generator power output (MW_corr) is calculated from available parameter values as follows (Equation 1):

$$MW\_corr = DWATT*f(AFPAP)*f(AFPCS)*f(AFPEP)*T(CMHUM)*f(CTIMX)*f(DPF)*f(TNH)*f(WQJ)*f(AUX) \quad (Equ. 1)$$

where: MW_corr is the corrected gas turbine-generator power output (MW); DWATT is the measured gas turbine-generator power output (MW); f(AFPAP) is a function of measured atmospheric pressure (in Hg) and provides a correction for ambient pressure; f(AFPCS) is a function of measured inlet pressure loss (in H$_2$O); f(AFPEP) is a function of measured exhaust pressure loss (in H$_2$O); f(CMHUM) is a function of calculated compressor inlet humidity (lb/lb); f(CTIMX) is a function of measured compressor inlet temperature (deg); f(DPF) is a function of calculated generator power factor; f(TNH) is a function of measured turbine rotational speed (RPM); f(WQJ) is a function of measured water or steam injection flow (lbs/sec), and f(AUX) is a function of assumed auxiliary power loss (kW).

The actual functions of the above parameters may vary according to a particular application and turbine. A person of ordinary skill in this art, e.g., a gas turbine engineer with several years of experience in control systems, will be fully capable of developing the actual functions for the equations for a particular turbine application. Further, any one application may not employ all of the above-listed functions. For example, the functions related to water or steam injection may not be included in turbine applications that did not have water or steam injection.

Corrected gas turbine-generator power output margin (MW_mar) may be determined in accordance with Equation 2, as follows:

$$MW\_mar = ((MW\_corr/MW\_ref) - 1)*100 \quad (Equ. 2)$$

where: MW_mar is the corrected gas turbine-generator power output margin (%); MW_corr is the corrected gas turbine-generator power output (MW); and MW_ref is the reference gas turbine-generator power output (MW).

The reference power output will usually be the guaranteed power output value which is generally stated by the turbine manufacturer.

Corrected gas turbine-generator heat rate (HR_corr) is calculated from available parameter values as follows in equation 3:

$$HR\_corr = FQ*LHV*CF/ DWATT*f(AFPAP)*f(AFPCS)*f(AFPEP*f(CMHUM)*f(CTIMX)f(DPF)*f(TNH)*f(WQJ)*f(AUX) \quad (Equ. 3)$$

where: HR_corr is the corrected gas turbine-generator heat rate (BTU/kWh); FQ is the measured gas turbine fuel flow (lb/s); LHV is the assumed fuel lower heating value (BTU/lb); CF is a units conversion factor; DWATT is a measured gas turbine-generator power output (MW); f(AFPAP) is a function of measured atmospheric pressure (in Hg); F(AFPCS) is a function Of measured inlet pressure loss (in H$_2$O); F(AFPEP) is a function of measured exhaust pressure loss (in H$_2$O); f(CMHUM)=function of calculated compressor inlet humidity (lb/lb); f(CTIMX) is a function of measured compressor inlet temperature (deg.); f(DPF) is a function of calculated generator power factor; f(TNH) is a function of measured turbine rotational speed (RPM);

f(WQJ) is a function of measured water or steam injection flow (lbs/sec); and F(AUX) is a function of assumed auxiliary power loss (kW).

The actual functions of the above parameters will vary according to the particular application. A person of ordinary skill in this field should be fully capable of developing the algorithms for each of the above listed functions. Further, not all of these functions will apply in all cases (e.g. water or steam injection system may not be installed)

The corrected gas turbine-generator heat rate margin (HR_mar) may be determined from the following equation 4:

$$HR\_mar = (1 - (HR\_corr/HR\_ref))*100 \quad (Equ. 4)$$

where: HR_mar is the corrected gas turbine-generator heat rate margin (%); HR_corr is the corrected gas turbine-generator heat rate (BTU/kWh); and HR_ref is the reference gas turbine-generator heat rate (BTU/kWh).

The reference heat rate may often be the guaranteed heat rate value established by the manufacturer of the turbine. The actual functions of the above parameters will vary according to the particular application. A person of ordinary skill in this field should be fully capable of developing the algorithms for each of the above listed functions. Further, not all of these functions will apply in all cases (e.g. water or steam injection system may not be installed).

Figure 3:
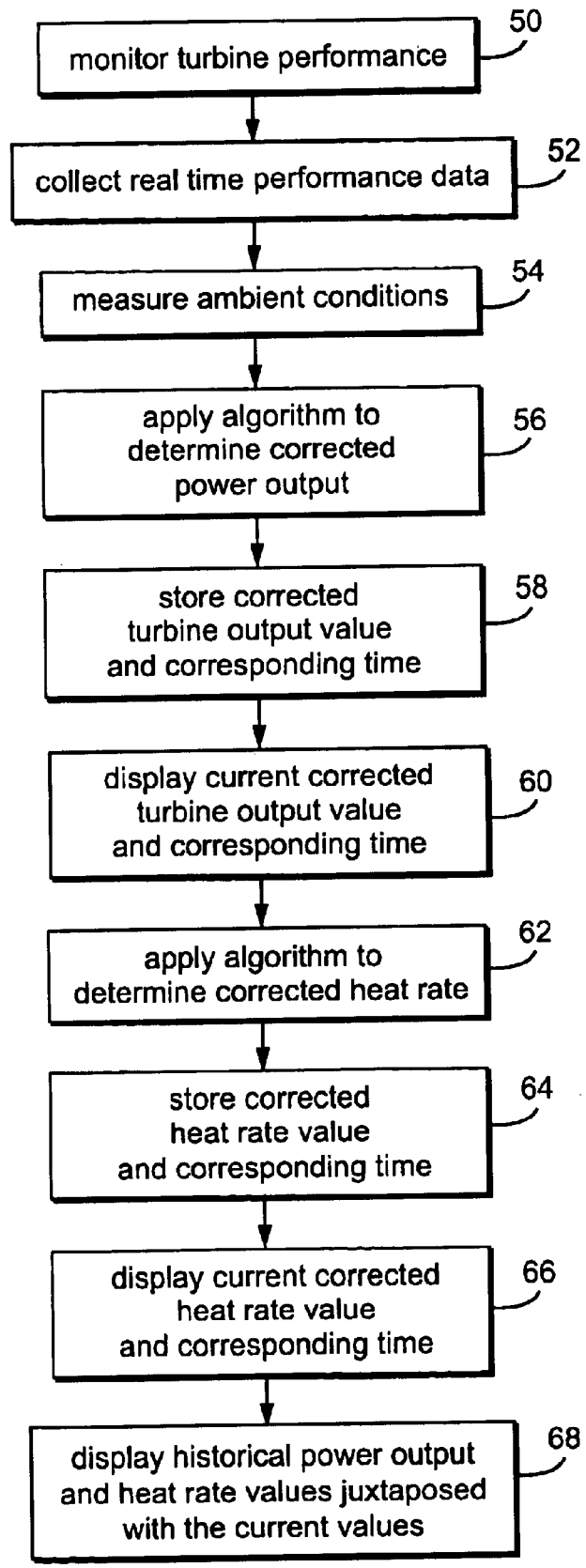
FIG. 3 is an exemplary flow chart

FIG. 3 is a flow chart of the steps for determining and displaying the correct power output and heat rate values. In step 50, the turbine performance is monitored with sensors and data is collected from the sensors using the controller 18. Data from the sensors needed to calculate the power output and heat rate of the gas turbine is stored in memory of the controller, in step 52. In addition, the ambient conditions, e.g., temperature and pressure, are measured in step 54.

With the stored data, the controller applies algorithms (see equations 1 and 2) to determine a current corrected power output margin, in step 56. The time corresponding to the calculated power output margin is correlated and stored with the power output margin, in step 58. In step 60, the power output margin and the corresponding time are displayed on a screen display 24. Similarly, the controller applies the algorithms (see equations 3 and 4) to determine a current corrected heat rate margin value and is correlated to the corresponding time, in step 62. The values for the power output and heat rate margins are time-stamped, stored (64) and displayed (66) by the controller. As time passes, the recently stored values of corrected power output and heat rate margins are displayed as historical values on the screen, in step 68.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for generating and displaying in real time performance parameters of a turbine comprising:
   a. monitoring the performance of the turbine and collecting real time data regarding turbine performance;
   b. determining a corrected turbine output value from the collected real time data;
   c. electronically storing the corrected turbine output value and a corresponding time;
   d. displaying a current corrected turbine output value and a corresponding time, wherein the stored corrected turbine output value and its corresponding time become, as the new current corrected turbine output value is determined, historical data regarding a past corrected turbine output value at the corresponding time, and
   e. displaying the stored historical information regarding the past corrected turbine power output juxtaposed with the current corrected turbine output value.

2. A method for generating and displaying in real time performance parameters of a turbine comprising:
   a. monitoring the performance of the turbine and collecting real time data regarding turbine performance;
   b. determining a corrected turbine output value from the collected real time data;
   c. electronically storing the corrected turbine output value and a corresponding time;
   d. displaying the current corrected turbine output value and a corresponding time, wherein the corrected turbine output value is determined from the following algorithm:

$$MW\_corr = DWATT*f(AFPAP)*f(AFPCS)*f(AFPEP)*f(CMHUM)*f(CTIMX)*f(DPF)*f(TNH)*f(WQJ)*f(AUX)$$

where: MW_corr is the corrected turbine power output (MW); DWATT is a measured gas turbine-generator power output (MW); f(AFPAP) is a function of measured atmospheric pressure; f(AFPCS) is a function of measured inlet pressure loss; f(AFPEP) is a function of measured exhaust pressure loss; f(CMHUM) is a function of calculated compressor inlet humidity; f(CTIMX) is a function of measured compressor inlet temperature; f(DPF) is a function of calculated generator power factor; f(TNH) is a function of measured turbine rotational speed; f(WQJ) is a function of measured water or steam injection flow, and f(AUX) is a function of assumed auxiliary power loss.

3. A method for generating and displaying in real time performance parameters of a turbine comprising:
   a. monitoring the performance of the turbine and collecting real time data regarding turbine performance;
   b. determining a corrected turbine output value from the collected real time data;
   c. electronically storing the corrected turbine output value and a corresponding time;
   d. displaying a current corrected turbine output value and a corresponding time, and
   e. displaying historical information regarding the stored corrected turbine power output juxtaposed with the corrected turbine output value.

4. A method for generating and displaying in real time performance parameters of a turbine comprising:
   a. monitoring the performance of the turbine and collecting real time data regarding turbine performance;
   b. determining a corrected turbine heat rate from the collected real time data;
   c. electronically storing the corrected turbine heat rate value and a corresponding time;
   d. displaying a current corrected turbine heat rate value and its corresponding time, wherein the stored corrected turbine heat rate value and its corresponding time become, as a the current corrected turbine heat rate value is determined, historical data regarding a past corrected turbine heat rate value and the corresponding time for the past corrected turbine heat rate value, and
   e. displaying the stored historical information regarding the past corrected turbine heat rate value juxtaposed with the current corrected turbine heat rate value.

5. A method for generating and displaying in real time performance parameters of a turbine comprising:
   a. monitoring the performance of the turbine and collecting real time data regarding turbine performance;
   b. determining a corrected turbine heat rate from the collected real time data;
   c. electronically storing the corrected turbine heat rate value and a corresponding time;
   d. displaying a current corrected turbine heat rate value and its corresponding time, and
   wherein the corrected turbine heat rate value is determined from the following algorithm:

$$HR\_corr = FQ*LHV*CF/DWATT*f(AFPAP)*f(AFPCS)*f(AFPEP)*f(CMHUM)*f(CTIMX)*f(TNH)*f(WQJ)*f(AUX)$$

where HR_corr is the corrected turbine heat rate; FQ is a fuel flow to a combustor of the turbine; LHV is a fuel heating value; CF is a units conversion factor; DWATT is a measured turbine power output; f(AFPAP) is a function of measured atmospheric pressure; f(AFPCS) is a function of measured inlet pressure loss; f(AFPEP) is a function of measured turbine exhaust pressure loss; f(CMHUM) is a function representing turbine compressor inlet humidity; f(CTIMX) is a function of measured compressor inlet temperature; f(TNH) is a function of measured turbine rotational speed; f(WQJ) is a function of measured water or steam injection flow; and f(AUX) is a function of assumed auxiliary power loss.

6. A method for generating and displaying in real time performance parameters of a turbine comprising:
   a. monitoring the performance of the turbine and collecting real time data regarding turbine performance;
   b. determining a corrected turbine heat rate from the collected real time data;
   c. electronically storing the corrected turbine heat rate value and a corresponding time;
   d. displaying a current corrected turbine heat rate value and its corresponding time, and
   e. displaying historical information regarding the stored corrected turbine power heat rate juxtaposed with the corrected turbine output heat rate value.

* * * * *

UNITED STATES PATENT AND TRADEMARK OFFICE
CERTIFICATE OF CORRECTION

PATENT NO. : 6,898,540 B2
DATED : May 24, 2005
INVENTOR(S) : Stephen J. Davies

It is certified that error appears in the above-identified patent and that said Letters Patent is hereby corrected as shown below:

<u>Column 6,</u>
Line 62, delete the word "output".

Signed and Sealed this

Twentieth Day of September, 2005

JON W. DUDAS
*Director of the United States Patent and Trademark Office*